(12) United States Patent
O'Connor

(10) Patent No.: US 8,615,329 B2
(45) Date of Patent: Dec. 24, 2013

(54) CONTROL SYSTEM FOR REGULATING LIQUID FLOW

(75) Inventor: Thomas M. O'Connor, Tarpon Springs, FL (US)

(73) Assignee: Water Optimizer LLC, Tampa, FL (US)

( * ) Notice: Subject to any disclaimer, the term of this patent is extended or adjusted under 35 U.S.C. 154(b) by 0 days.

(21) Appl. No.: 11/985,815

(22) Filed: Nov. 16, 2007

(65) Prior Publication Data

US 2008/0119948 A1    May 22, 2008

Related U.S. Application Data

(60) Provisional application No. 60/860,276, filed on Nov. 20, 2006, provisional application No. 60/962,325, filed on Jul. 27, 2007.

(51) Int. Cl.
*G05B 15/00*    (2006.01)
*G05D 7/00*    (2006.01)
*G05D 11/00*    (2006.01)

(52) U.S. Cl.
USPC ............... 700/282; 700/284; 700/285; 137/1; 137/2; 137/78.3; 137/487.5; 137/624.11; 702/100; 239/11; 239/63; 239/101; 340/602; 222/15

(58) Field of Classification Search
USPC .......................................... 700/285, 282, 284
See application file for complete search history.

(56) References Cited

U.S. PATENT DOCUMENTS

| | | | |
|---|---|---|---|
| 4,176,395 A | 11/1979 | Evelyn-Veere | |
| 4,209,131 A | 6/1980 | Baarash et al. | |
| 4,584,654 A * | 4/1986 | Crane | 702/44 |
| 5,039,251 A * | 8/1991 | Schlueter et al. | 405/39 |
| 5,048,755 A * | 9/1991 | Dodds | 239/64 |
| 5,251,153 A | 10/1993 | Nielsen | |
| 5,293,554 A | 3/1994 | Nicholson | |
| 5,740,031 A * | 4/1998 | Gagnon | 700/16 |
| 5,870,302 A | 2/1999 | Oliver | |
| 5,921,280 A * | 7/1999 | Ericksen et al. | 137/624.11 |
| 6,209,576 B1 * | 4/2001 | Davis | 137/487.5 |
| 6,240,336 B1 | 5/2001 | Brundisini | |
| 6,312,191 B1 * | 11/2001 | Rosenfeld | 405/37 |
| 7,050,887 B2 | 5/2006 | Alvarez | |

(Continued)

FOREIGN PATENT DOCUMENTS

WO    WO 93/05246    3/1993

OTHER PUBLICATIONS

Wikipedia, "Sensor node", 2010, pp. 1-9.*

(Continued)

*Primary Examiner* — Ryan A. Jarrett
*Assistant Examiner* — Olvin Lopez Alvarez
(74) *Attorney, Agent, or Firm* — Frijouf Rust & Pyle P.A.

(57) ABSTRACT

A control system is disclosed for regulating the flow of a liquid from a liquid provider through a liquid distribution system. The distribution system has a major liquid distribution channel connected to a plurality of minor liquid distribution channels providing the liquid to a multiplicity of users. A plurality of controllable user valves are interposed in the multiplicity of user channels. A liquid monitor senses a liquid flow characteristic within the liquid distribution channel. A user control changes selective controllable user valves for restoring a desired liquid flow characteristic within the liquid distribution channel.

16 Claims, 10 Drawing Sheets

(56) References Cited

U.S. PATENT DOCUMENTS

| | | |
|---|---|---|
| 7,229,026 B2 * | 6/2007 | Evelyn-Veere ............... 239/11 |
| 7,233,781 B2 * | 6/2007 | Hunter et al. ............. 455/404.1 |
| 7,406,363 B2 * | 7/2008 | Doering et al. .............. 700/284 |
| 2001/0049563 A1 * | 12/2001 | Addink et al. ................ 700/19 |
| 2002/0002425 A1 * | 1/2002 | Dossey et al. ............... 700/284 |
| 2003/0093159 A1 * | 5/2003 | Sieminski ...................... 700/12 |
| 2003/0179102 A1 | 9/2003 | Barnes |
| 2004/0039489 A1 | 2/2004 | Moore |
| 2004/0064217 A1 | 4/2004 | Addink |
| 2004/0076469 A1 | 4/2004 | Audet |
| 2004/0078092 A1 | 4/2004 | Addink |
| 2004/0117330 A1 | 6/2004 | Ehlers |
| 2004/0133314 A1 | 7/2004 | Ehlers |
| 2004/0138981 A1 | 7/2004 | Ehlers |
| 2004/0139038 A1 | 7/2004 | Ehlers |
| 2004/0206405 A1 * | 10/2004 | Smith et al. ............. 137/624.12 |
| 2004/0217190 A1 | 11/2004 | Silva |
| 2005/0016593 A1 * | 1/2005 | Ephrat et al. ................ 137/488 |
| 2005/0033707 A1 | 2/2005 | Ehlers |
| 2005/0137752 A1 * | 6/2005 | Alvarez ....................... 700/282 |
| 2005/0156068 A1 * | 7/2005 | Ivans ............................ 239/723 |
| 2005/0251339 A1 * | 11/2005 | Araki et al. ..................... 702/2 |
| 2006/0074529 A1 * | 4/2006 | Garcia ......................... 700/283 |
| 2006/0116791 A1 | 6/2006 | Ravula |
| 2006/0127183 A1 * | 6/2006 | Bishop, Jr. ..................... 405/37 |
| 2006/0161309 A1 | 7/2006 | Moore |
| 2006/0174707 A1 * | 8/2006 | Zhang ............................ 73/592 |
| 2007/0021936 A1 * | 1/2007 | Marovitz ..................... 702/100 |
| 2009/0204265 A1 * | 8/2009 | Hackett ........................ 700/284 |
| 2010/0010682 A1 * | 1/2010 | Cardinal et al. ............. 700/284 |
| 2011/0238230 A1 * | 9/2011 | Runge et al. ................. 700/284 |

OTHER PUBLICATIONS

ET Water, "Flow Monitoring and Control", downloaded Oct. 5, 2011, pp. 2.*

Reclamation, "Weather Based technologies for Residential Irrigation Scheduling", May 2004, pp. 1-30.*

* cited by examiner

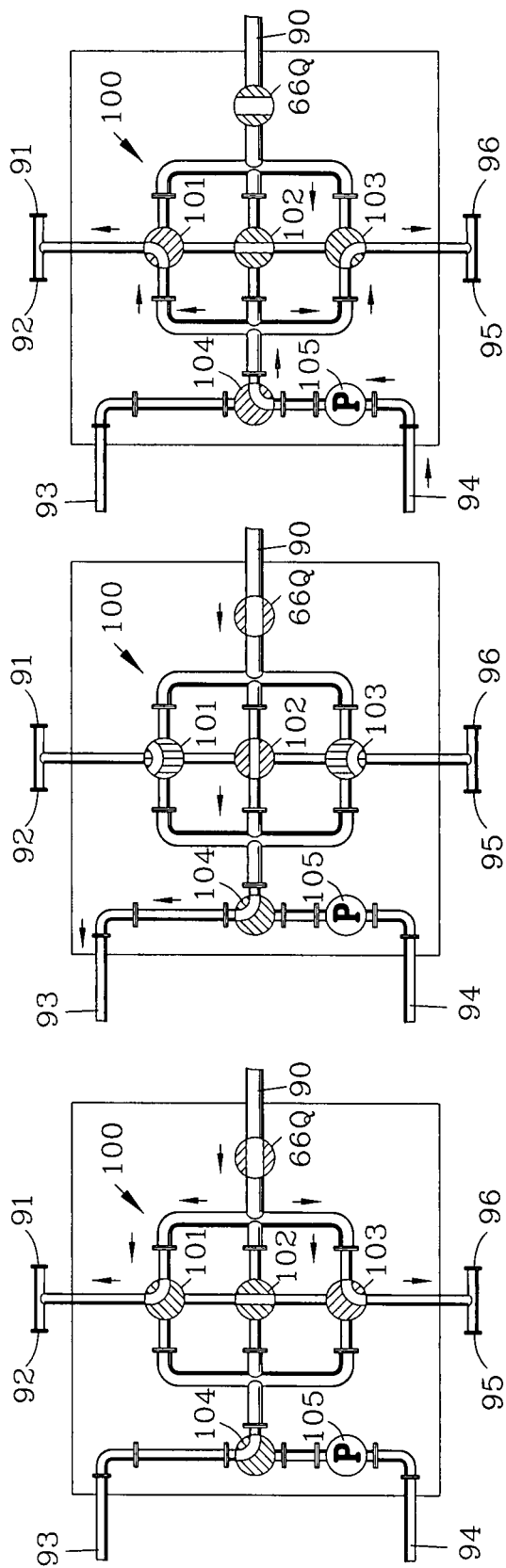

CONTROL SYSTEM FOR REGULATING LIQUID FLOW

CROSS-REFERENCE TO RELATED APPLICATIONS

This application claims benefit of U.S. provisional application Ser. No. 60/860,276 filed Nov. 20, 2006 and U.S. provisional application Ser. No. 60/962,325 filed Jul. 27, 2007. All subject matter set forth in U.S. provisional application Ser. No. 60/860,276 filed Nov. 20, 2006 and U.S. provisional application Ser. No. 60/962,325 filed Jul. 27, 2007 is hereby incorporated by reference into the present application as if fully set forth herein.

BACKGROUND OF THE INVENTION

1. Field of the Invention

This invention relates to the control of liquid and more particularly to the control of fluids in a fluid distribution system.

2. Background of the Invention

The prior art has proposed various types of liquid control systems for controlling the flow and distribution of liquids. Some of these prior art liquid control systems relate to water control systems for controlling the flow and distribution of water. Recently, many water control systems have been provided to manage the volume of water used by agricultural, commercial, industrial, recreational or residential sites. These water management control systems have reduced the volume of water used through the limitation of the volume of water used and/or by reclaiming water. These liquid control systems have resulted in a substantial reduction of the use of water at commercial, industrial, recreational or residential sites.

The irrigation of vegetation for agricultural, commercial, industrial, recreational or residential sites is a significant interest in the management of water. Many of liquid control systems for irrigation systems reduce the volume of water use by compensating for rainfall, humidity, temperature and the like. These liquid control systems have resulted in a substantial reduction of the use of water for irrigation systems in agricultural, commercial, industrial, recreational or residential sites.

The following United States patents are representative of liquid control systems directed to the reduction of the use of water for a commercial or a residential site.

U.S. Pat. No. 4,176,395 to Evelyn-Veere et al. discloses an irrigation control system and a related method for controlling a large number of valves in accordance with a plurality of schedules of instructions provided by the user of the system. Schedules of instructions may be created or modified during normal operation of the system by utilizing a variety of command sequences on a keyboard and display device, and schedules may also be reviewed or monitored during operation. The control system includes apparatus for processing a plurality of digital inputs by means of which the conditions of sensing devices located in the field are monitored and can be used to condition execution of the schedules of instructions. The control system is disclosed for use with a two-wire irrigation system in which on/off control signals are encoded into a power signal for transmission along a pair of wires to which decoding units are connected. The control system includes an input/output service module which transmits on/off control signals to the decoding units repeatedly, as rapidly as the two-wire system will permit, to ensure that the valves remain switched in the manner intended.

U.S. Pat. No. 5,251,153 to Nielsen et al. discloses a programmed irrigation controller automatically computes durations for schedules and controls split irrigation cycles at up to eight watering stations. The controller is manually entered with high-level information regarding soil type, terrain, and irrigation system watering head type, and also with a total irrigation time, for each station. The maximum "on" time duration for each individual split irrigation cycle, and a minimum "off" time duration, are determined from the high-level information input by table lookup. The controller computes the number of irrigation cycles at each station as its total irrigation time divided by its maximum "on" time duration. The controller schedules composite irrigation cycles for all stations so that no station over-eaters within a single irrigation cycle or upon successive irrigation cycles that are too closely time proximate. Exclusionary time-of-day intervals that specify when no watering will occur can be inserted within the schedules. A water budgeting factor proportionately controls the numbers of split irrigation cycles. Special overlaid schedules provide useful special irrigation sequences/durations such as one-time deep soak, periodic deep soak, or syringe cycles. The programmed irrigation control for a single station may be copied for the control of additional stations, U.S. Pat. No. 5,293,554 to Nicholson discloses a program controlled irrigation system operates with two programs. Program A and Program B, for irrigating a plurality of zones. Selected zones are dedicated to the irrigation of grass, for example, under Program A while other zones are dedicated to the irrigation of shrubs, for example, under Program B. A total of six times for starting an irrigation cycle are available for both Programs A and B. Under program control, the six starting times can be allocated in any combination to Programs A and B. Further, starting times can be shifted readily between Programs A and B thereby providing flexibility to meet the changing demands in grass and shrub irrigation. Each zone is constantly monitored for overcurrent conditions wherein zone operation is terminated if the overcurrent of the particular zone is sustained beyond a set period. Also, if the current reaches an excessive level in a very short period, zone operation is terminated. Even though a single zone operation has been terminated as noted above, other zones can continue to operate unless the operation of two successive zones has been terminated whereupon the operation of the entire system is terminated.

U.S. Pat. No. 5,870,302 to Oliver discloses a system and method for using evapotranspiration (ET) and/or predicted precipitation data in controlling automated and semi-automated irrigation systems. In accordance with the present invention, meteorological data is monitored and used to adjust watering schedules for an irrigation site. A central computer uses the meteorological data and ET data to compute a watering factor. The watering factor represents the difference between a reference watering schedule (which can be stored at the irrigation site) and a new watering schedule. The new watering schedule can be based on similar climatic conditions of a geographic area in which the irrigation site is located. The watering factor is then sent to the irrigation site, which uses the watering factor to modify the reference watering schedule. Alternatively, meteorological data and site characteristics can be monitored at the irrigation site and sent to the central computer, which then computes the watering factor based on this specific site information. The computed ET data is preferably based on a current prediction of future events based upon present meteorological conditions.

U.S. Pat. No. 6,240,336 to Brundisini discloses a control unit for an irrigation system comprising a programmable electronic control unit having a plurality of output control lines for the control of actuators of the irrigation system and comprising a microprocessor for setting data that condition the operation of the control unit. The microprocessor is operable to allow a standard programming of the electronic control unit for setting data suitable for allowing the base operation of the control unit, and an advanced programming for setting further data suitable for customizing the base operation of the control unit.

U.S. Pat. No. 6,312,191 to Rosenfeld discloses a self-contained ecological watering system, protected against obturations, and capable of irrigating at low cost uniformly and regularly a variety of cultivated areas; the system operates automatically a series of fertinigation cycles requiring minimum actuation power and reduced water flow rate. The system permits implementation of various configuration including a plurality of local subsystems which are controllable locally or from a remote station; each subsystem comprises a container capable of accumulating the volume of liquid to be discharged per cycle, a watering assembly capable of regulating the watering volume and discharging it upon receiving a low power signal; a low consumption electronic control unit capable of determining the frequency and the appropriate time to send said signal; and a low restriction distribution network capable of transporting the water to irrigate the locations in need.

U.S. Patent application 2003/0179102 to Barnes discloses a system for controlling an irrigation system having a monitor for remotely monitoring and communicating irrigation related information in the system, a controller in communication with the monitoring means for receiving the information, processing the information to coding functional commands, and sending the information to the irrigation system, and a decoder in communication with the controller for decoding the coded signal at specific sites in the irrigation system and performing a function based upon the signal. A method for remotely controlling an irrigation system by providing the system with irrigation related information and remotely modulating the system based upon the irrigation related information. A software program controls an irrigation system, the program having a central processing unit for running the program and an algorithm for controlling the irrigation system.

U.S. Patent application 2004/0039489 to Moore et al. discloses an irrigation control system and method for controlling irrigation based on weather data. Weather data such as wind, temperature, solar radiation, humidity, and rainfall, may be collected at one or more weather stations for a region. The weather data may be compiled on a computer and transmitted to a paging broadcast service. The weather data may then be transmitted by the paging broadcast service to controller interfaces associated with irrigation systems throughout the region. The controller interfaces may adjust irrigation controllers associated with the irrigation systems based on the weather data such that the proper amount of water is applied. This allows the water to be used more efficiently and the health of the landscape to be improved.

U.S. Patent application 2004/0064217 to Addink et al. discloses a recording node at a consumer site that is used for the receiving, storing, determining and/or sending of utility commodity information. The recording node is an integral part of networks or can access networks for the receiving and transmitting of information. The recording node is part of a network process control system that includes other nodes, such as a controller, computer, monitor, display and communication node. The recording node receives data on utility commodity flow rates, commodity pressure and environmental factors; stores the data; performs determinations on the data; and sends utility commodity information over the network to consumers and/or third parties. The utility commodity may be water, electricity and/or gas. The information the consumers and third parties receive over the network from the recording node and other nodes assists them in their management of process systems.

U.S. Patent application 2004/0078092 to Addink et al. discloses a system and method in which an irrigation management system reduces high peak water use values by utilizing a microprocessor disposed in an irrigation controller to receive peak water use information from a water supplier receive water use information at a consumer site and automatically derive a new irrigation schedule that is at least partly based on the information received. The new irrigation schedule, derived by the microprocessor, may include a modification in a default irrigation frequency, a modification in a default irrigation start time(s), a reduction in a default irrigation application duration, the use of a rolling-average in the determination of the new irrigation application duration and other changes or modifications to the default irrigation schedule that will provide for the reduction in high peak water use values. Additionally, the microprocessor will display to the water user and/or third parties details on the new irrigation schedule and information received from the water supplier.

U.S. Patent application 2004/0117330 to Ehlers et al. discloses a system and method manage delivery of energy from a distribution network to one or more sites. Each site has at least one device coupled to the distribution network. The system includes a node and a control system. The node is coupled to the at least one device for sensing and controlling energy delivered to the device. A control system is coupled to the node and distribution network for delivering to the node at least one characteristic of the distribution network. The node for controls the supply of energy to the device as a function of the at least one characteristic.

U.S. Patent application 2004/0133314 to Ehlers et al. discloses a system and method manage delivery of energy from a distribution network to one or more sites. Each site has at least one device coupled to the distribution network. The at least one device controllably consumes energy. The system includes a node and a control system. The node is coupled to the at least one device for sensing and controlling energy delivered to the device. A control system is coupled to the node and distribution network for delivering to the node at least one characteristic of the distribution network. The node for controls the supply of energy to the device as a function of the at least one characteristic.

U.S. Patent application 2004/0138981 to Ehlers et al, discloses a system and method manage delivery of energy from a distribution network to one or more sites. Each site has at least one device couple to the distribution network. The at least one device controllably consumes energy. The system includes a node and a control system. The node is coupled to the at least one device for sensing and controlling energy delivered to the device. A control system is coupled to the node and distribution network for delivering to the node at least one characteristic of the distribution network. The node for controls the supply of energy to the device as a function of the at least one characteristic, U.S. Patent application 2004/0139038 to Ehlers et al. discloses a system and method manage delivery of energy from a distribution network to one or more sites. Each site has at least one device couple to the distribution network. The at least one device controllably consumes energy. The system includes a node and a control system. The node is coupled to the at least one device for sensing and controlling energy delivered to the device. A control system is coupled to the node and distribution network for delivering to the node at least one characteristic of the distribution network. The node for controls the supply of energy to the device as a function of the at least one characteristic.

U.S. Patent application 2005/0033707 to Ehlers et al. discloses system and method manage delivery of energy from a distribution network to one or more sites. Each site has at least one device coupled to the distribution network. The at least one device controllably consumes energy. The system includes a node and a control system. The node is coupled to the at least one device for sensing and controlling energy delivered to the device. A control system is coupled to the node and distribution network for delivering to the node at least one characteristic of the distribution network. The node for controls the supply of energy to the device as a function of the at least one characteristic.

U.S. Patent application 2005/0137752 to Alvarez discloses a wireless sensor and control transmitter system is provided for operating an irrigation or other hydraulic system. The system includes a master module unit hardwired to and in communication with the hydraulic system controller, and a field module unit that is hardwired to and in communication with field electromechanical control devices such as valves, solenoids and servo motors, and field sensors indicating, for example, atmospheric conditions. The master module unit and field module unit communicate with digital wireless communication and can act as a simple wireless bridge. The master module and field module units are capable of digitizing input signals from the devices to which they are hardwired and transmitting them to the opposite module; they are further capable of deciphering the digitized signals received to reproduce the original input signal and communicating it to the device to which it is hardwired. Supplemental functionality may be added to an existing hydraulic control system by including the WSCX and its system features of control and sensor functionality that may not otherwise be available in an existing controller system.

U.S. Patent application 2006/0116791 to Ravula et al. discloses an intelligent local irrigation system includes one or more sprinklers and a controller coupled to the one or more sprinklers via a wired or wireless connection and enabled to control the sprinklers thereby. A controller arrangement establishes connectivity with an internet service portal which stores a profile of the local irrigation system and which obtains information from internet-based resources. The internet service portal determines an irrigation schedule based on the profile and on information obtained from the internet-based information resources and provides the irrigation schedule to the controller arrangement for implementation.

U.S. Patent application 2006/0161309 to Moore et al. discloses an irrigation control system and method for controlling irrigation based on weather data. Weather data such as wind, temperature, solar radiation, humidity, and rainfall, may be collected at one or more weather stations for a region. The weather data may be compiled on a computer and transmitted to a paging broadcast service. The weather data may then be transmitted by the paging broadcast service to controller interfaces associated with irrigation systems throughout the region. The controller interfaces may adjust irrigation controllers associated with the irrigation systems based on the weather data such that the proper amount of water is applied. This allows the water to be used more efficiently and the health of the landscape to be improved.

Although the liquid control systems set forth in the foregoing United States patents have reduced the use of water, these liquid control systems have not addressed the problems associated with the water distribution systems between a water source and an agricultural, commercial, industrial, recreational or residential site. The recent and substantial increase in the number of agricultural, commercial, industrial, recreational or residential sites have placed an excessive burden upon the existing distribution systems between the water source and the agricultural, commercial, industrial, recreational or residential sites. Many of these liquid distribution systems have not been upgraded to accommodate for recent and substantial increase in the number of agricultural, commercial, industrial, recreational or residential sites due to the substantial time, substantial inconvenience and the substantial cost of upgrading associated with upgrading these distribution systems.

Although the above mentioned have contributed to the water management in agricultural, commercial, industrial, recreational or residential sites, none of the prior art references have addressed the issue of the management of water from a water provider to the agricultural, commercial, industrial, recreational or residential sites.

The recent and substantial increase in the number of agricultural, commercial, industrial, recreational or residential site sites have placed an excessive burden upon the existing distribution systems between the water source and the agricultural, commercial, industrial, recreational or residential sites. Many of these liquid distribution systems have not been upgraded to accommodate for recent and substantial increase in the number of agricultural, commercial, industrial, recreational or residential sites due to the substantial time, substantial inconvenience and the substantial cost of upgrading associated with upgrading these distribution systems.

Therefore it is an object of this invention to provide a control system for regulating the flow of a liquid from a liquid provider through a liquid distribution system that overcomes the problems of existing liquid distribution systems and provides a significant advancement to the liquid distribution art.

Another object of this invention is to provide a control system for regulating the flow of a liquid from a liquid provider which may be adapted to a pre-existing liquid distribution system.

Another object of this invention is to provide a control system for regulating the flow of a liquid from a liquid provider that maintains the liquid pressure in the liquid distribution system irrespective of the demand of an agricultural, commercial, industrial, recreational or residential site.

Another object of this invention is to provide a control system for regulating the flow of a liquid from a liquid provider that maintains the liquid level in the liquid distribution system irrespective of the demand of an agricultural, commercial, industrial, recreational or residential site.

Another object of this invention is to provide a control system for regulating the flow of a liquid from a liquid provider which maintains the liquid flow in the liquid distribution system irrespective of the demand of an agricultural, commercial, recreational or residential sites.

Another object of this invention is to provide a control system for regulating the flow of a liquid from a liquid provider which may incorporate existing liquid reduction techniques such as compensating for rainfall, humidity, temperature and the like.

Another object of this invention is to provide a control system for regulating the flow of a liquid from a liquid provider that is an inexpensive alternative solution to an expensive upgrade to a liquid distribution system.

The foregoing has outlined some of the more pertinent objects of the present invention. These objects should be construed as being merely illustrative of some of the more prominent features and applications of the invention. Many other beneficial results can be obtained by modifying the invention within the scope of the invention. Accordingly other objects in a full understanding of the invention may be had by referring to the summary of the invention and the detailed description describing the preferred embodiment of the invention.

SUMMARY OF THE INVENTION

The present invention is defined by the appended claims with specific embodiments being shown in the attached drawings. For the purpose of summarizing the invention, the invention relates to a control system for regulating the flow of a liquid from a liquid provider through a liquid distribution system. The distribution system has a major liquid distribution channel and coupled to a plurality of minor liquid distribution channels for providing the flow of the liquid to a multiplicity of users. The control system comprises a plurality of controllable user valves interposed in selected ones of the multiplicity of user channels. A liquid monitor is located in one of the major and minor liquid distribution channels for sensing a liquid flow characteristic within the liquid distribution channel. A control is connected to the monitor and the plurality of controllable user valves for changing selective ones of the plurality of controllable user valves upon the liquid monitor sensing the liquid flow characteristic for restoring a desired liquid flow characteristic within a selected one of the liquid distribution channels. The liquid monitor may comprise a liquid pressure monitor, a liquid level monitor or a liquid flow monitor. The valves may take various types of flow control devices including gates, weirs, and the like.

In a more specific example of the invention, each of the plurality of controllable user valves is connected to the control by one of a wireless connection and a wire connection. The liquid monitor provides a signal output upon sensing a liquid flow characteristic within one of the major and minor liquid distribution channels. The liquid monitor is connected the control by one of a wireless connection and a wire connection.

In one example, the control closes and/or restricts selective ones of the plurality of controllable user valves upon the liquid monitor sensing the undesired liquid flow characteristic for restoring a desired liquid flow characteristic within a selected one of the liquid distribution channels. In the alternative, the control opens and/or adjusts selective ones of the plurality of controllable user valves upon the liquid monitor sensing the undesired liquid flow characteristic for restoring a desired liquid flow characteristic within a selected one of the liquid distribution channels.

In another embodiment, the invention is incorporated into a control system for regulating the flow of a liquid from a liquid provider through a liquid distribution system. The distribution system has a major liquid distribution channel connected to a plurality of minor liquid distribution channels and coupled to a multiplicity of user channels for providing the flow of the liquid to a multiplicity of users. The control system comprises a plurality of controllable user valves interposed in selected ones of the multiplicity of user channels. A pressure monitor is located in one of the major and minor liquid distribution channels for sensing a liquid pressure characteristic within the liquid distribution channel. A control is connected to the monitor and the plurality of controllable user valves for changing selective ones of the plurality of controllable user valves upon the pressure monitor sensing the liquid pressure characteristic for restoring a desired liquid pressure characteristic within a selected one of the liquid distribution channels.

In a further embodiment, the invention is incorporated into a control system for regulating the flow a liquid from a liquid provider through a liquid distribution system. The distribution system has a major liquid distribution channel connected to a plurality of minor liquid distribution channels and coupled to a multiplicity of user channels for providing the flow the liquid a multiplicity users. The control system comprises a plurality of controllable user valves interposed in selected ones of the multiplicity of user channels. A level monitor is located in one the major and minor liquid distribution channels for sensing a liquid level characteristic within the liquid distribution channel. A control is connected to the monitor and the plurality of controllable user valves for changing selective ones of the plurality of controllable user valves upon the pressure monitor sensing the undesired liquid level characteristic for restoring a desired liquid level characteristic within a selected one of the liquid distribution channels.

In still another embodiment, the invention is incorporated into a control system for regulating the flow a liquid from a liquid provider through a liquid distribution system. The distribution system has a major liquid distribution channel connected a plurality minor liquid distribution channels and coupled to a multiplicity of user channels for providing the flow of the liquid to a multiplicity of users. The control system comprises a plurality of controllable user valves interposed in selected ones of the multiplicity of user channels. A flow monitor is located in one of the major and minor liquid distribution channels for sensing a liquid flow characteristic within the liquid distribution channel. A control is connected to the monitor and the plurality of controllable user valves for changing selective ones of the plurality of controllable user valves upon the flow monitor sensing the undesired liquid flow characteristic for restoring a desired liquid flow characteristic within a selected one of the liquid distribution channels.

In still a further embodiment, the invention is incorporated into a control system for regulating the flow of water from a water source through a water distribution system. The distribution system has a major water distribution channel connected to a plurality of minor water distribution channels and coupled to a multiplicity of user channels for providing the flow of the water to a multiplicity of users. The control system comprises a pressure monitor located in one of the major and minor water distribution channels for monitoring the pressure of the water within the water distribution channel. A plurality of controllable user valves are interposed in selected ones of the multiplicity of user channels. A control is connected to the pressure monitor and the plurality of controllable user valves for closing selective ones of the plurality of controllable user valves upon the pressure monitor sensing a predetermined low pressure in the one of the major and minor water distribution channels for terminating the water use of selective multiplicity of users for reducing the flow of a water to increase the pressure of the water within the water distribution channels.

The invention is also incorporated into a process for regulating the flow of a liquid from a liquid provider through a liquid distribution system comprising the steps of monitoring the pressure of the liquid in a liquid distribution channel. The liquid use of the multiplicity of users is monitored for terminating the liquid use of selective users for reducing the flow of a liquid and for increasing the pressure of the liquid within the liquid distribution channels.

In another embodiment of the process, the invention is incorporated into a process for regulating the flow of a liquid from a liquid provider through a liquid distribution system. The distribution system has a major liquid distribution channel connected to a plurality of minor liquid distribution channels and coupled to a multiplicity of user channels for providing the flow of the liquid to a multiplicity of users. The process comprises the steps of monitoring the pressure of the liquid in one of the major and minor liquid distribution channels. A plurality of controllable user valve are installed in selective ones of the multiplicity of user channels. Selective ones of the plurality controllable user valve are closed for terminating the liquid use of selective users for reducing the flow of a liquid to increase the pressure of the liquid within the liquid distribution channels.

In still another embodiment of the process, the invention is incorporated into a process for regulating the flow of water from a water source through a water distribution system. The distribution system has a major water distribution channel connected to a plurality of minor water distribution channels and coupled to a multiplicity of user channels for providing the flow of the water to a multiplicity of users. The process comprises the steps of monitoring the pressure of the water in the major water distribution channel. The water use of selective users is terminated for reducing the flow of a water to increase the pressure of the water within the major water distribution channel.

In further embodiment of the process, the invention is incorporated into a process for regulating the level of water from a water source through a water distribution system. The distribution system has a major water distribution channel connected to a plurality of minor water distribution channels and coupled to a multiplicity of user channels for providing the flow of the water to a multiplicity of users. The process comprises the steps of monitoring the level of the water in the major water distribution channel. The flow of the water is changed to selective users for restoring the level of water within the major water distribution channel.

The foregoing has outlined rather broadly the more pertinent and important features of the present invention in order that the detailed description that follows may be better understood so that the present contribution to the art can be more fully appreciated. Additional features of the invention will be described hereinafter which form the subject of the claims of the invention. It should be appreciated by those skilled in the art that the specific embodiments may be modified for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be made to the following detailed description taken in connection with the accompanying drawings in which:

FIG. 7 is a diagram of a valve system of FIG. 6 disposed in a first position;

FIG. 8 is a view of the valve system of FIG. 7 disposed in a second position;

FIG. 9 is a view of the valve system of FIG. 7 disposed in a third position;

Similar reference characters refer to similar parts throughout the several Figures of the drawings.

DETAILED DISCUSSION

Figure 1:
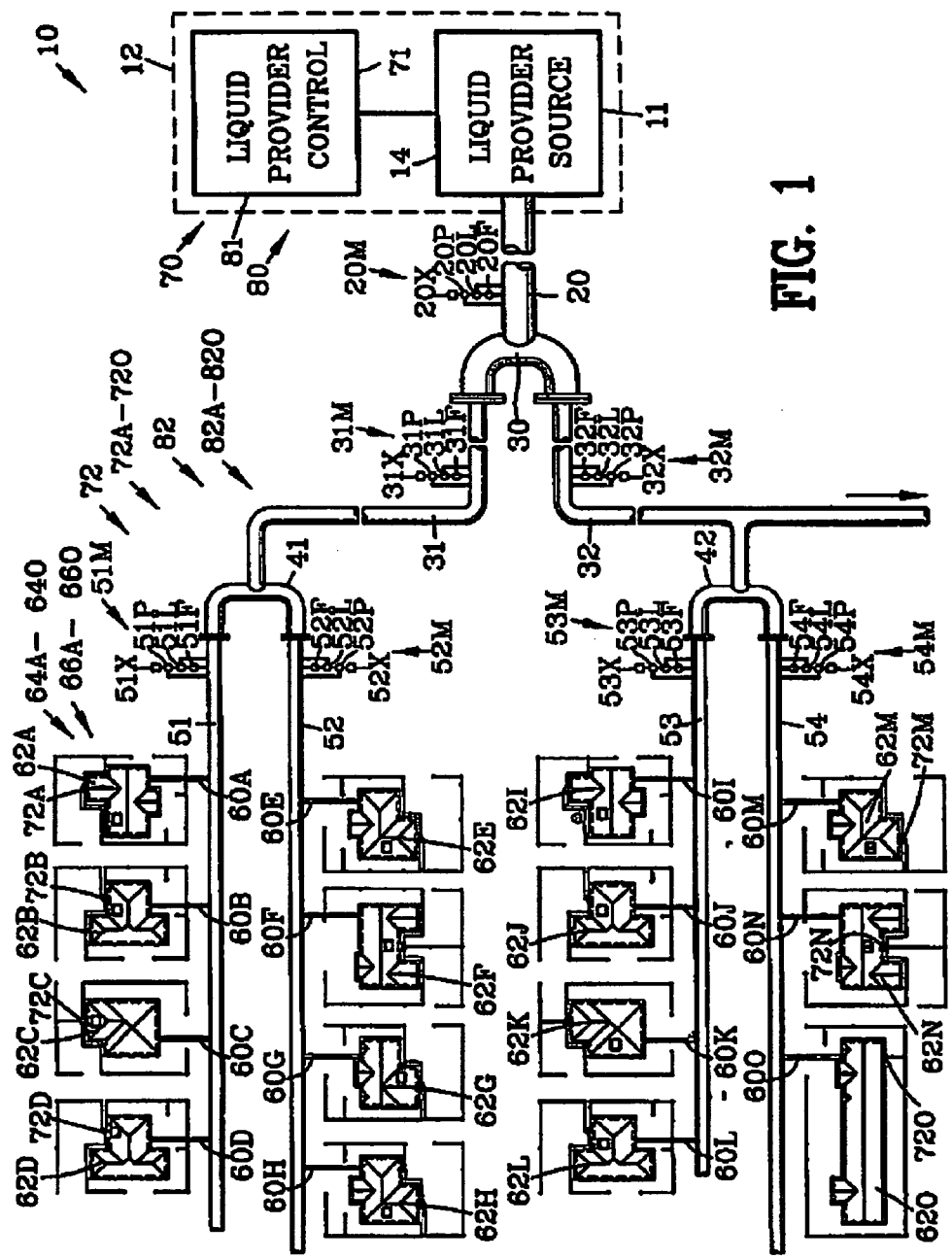
FIG. 1 is a top view of a first section of a first example of a liquid distribution system incorporating the present invention.
Figure 1A:
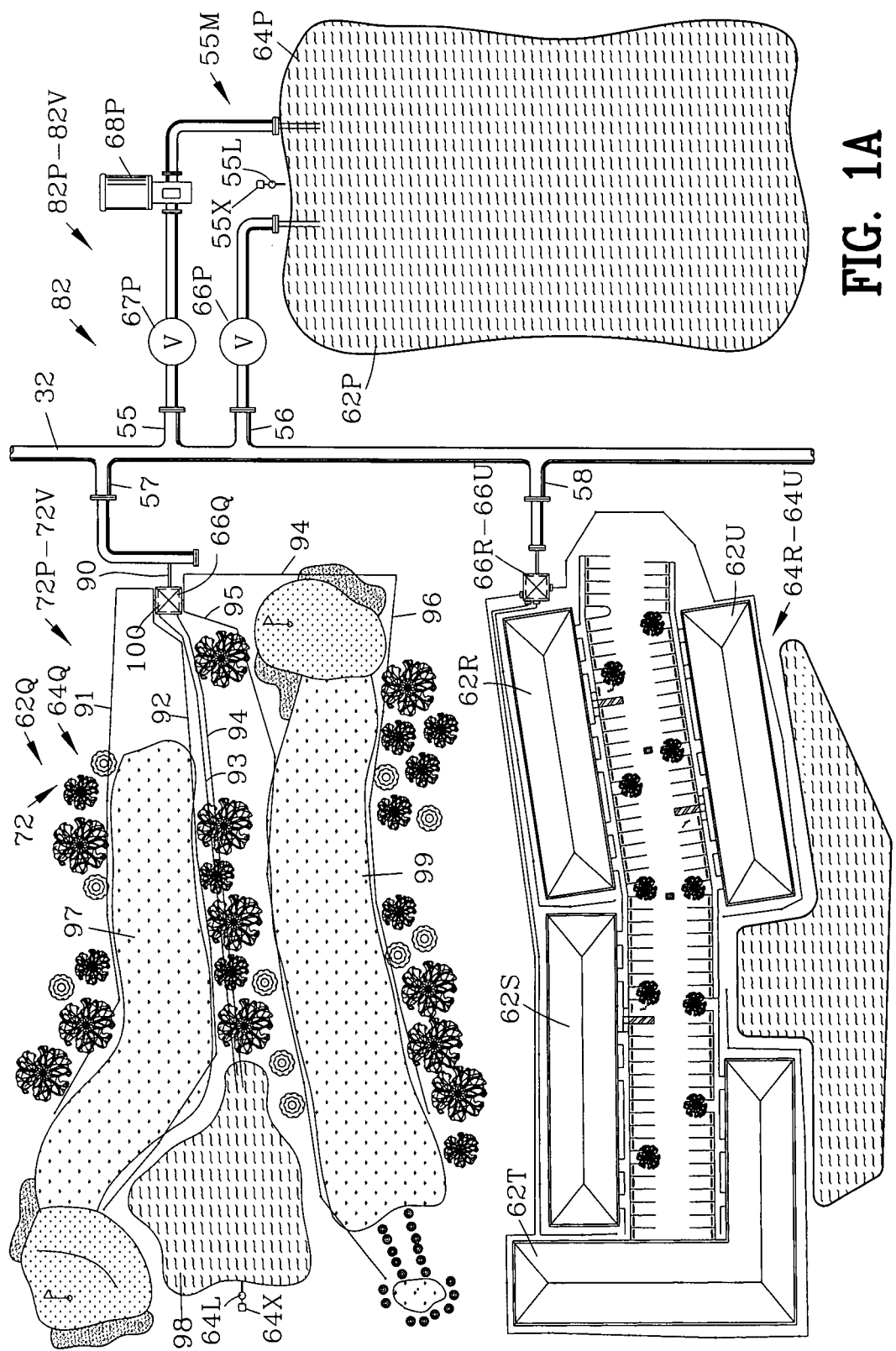
FIG. 1A is a top view of a second section of the liquid distribution system.

FIGS. 1 and 1A are top views of a first example of a liquid distribution system 10 for regulating the flow of a liquid 11 from a liquid provider 12 having a liquid source 14. In this example, the liquid provider 12 has been shown to be water provider 12 having a water source 14 such as a municipal water plant 12 or the like. However it should be appreciated by those skilled in the art that the present invention should not be limited to a water distribution system.

The distribution system 10 has a major liquid distribution channel 20 extending from the liquid provider 12. In this example, the major liquid distribution channel 20 is show as a liquid distribution conduit or pipe. The major liquid distribution channel 20 has a liquid monitor 20M for sensing a liquid flow characteristic within the liquid major liquid distribution channel 20. The liquid monitor 20M provides a signal output relative to the liquid flow characteristic within the major liquid distribution channels 20.

The liquid monitor 20M may comprise one or more liquid flow monitor 20F, a liquid level monitor 20L or a liquid pressure monitor 20P. The liquid flow monitor 20F senses a liquid flow characteristic such as a liquid flow rate within the major liquid distribution channel 20. The liquid level monitor 20L senses a liquid level characteristic such as a liquid level within the major liquid distribution channel 20. The liquid pressure monitor 20P senses a liquid pressure characteristic such as a liquid pressure within the major liquid distribution channel 20.

A remote telemetry unit 20X is connected to the liquid monitor 20M for providing communication between the liquid monitor 20M and the liquid provider 12. The remote telemetry unit 20X is connected to one or more of the liquid flow monitor 20F, the liquid level monitor 20L or the liquid pressure monitor 20P. The remote telemetry unit 20X relays the signal output from one or more of the liquid flow monitor 20F, the liquid level monitor 20L or the liquid pressure monitor 20P to the liquid provider 12 as will be described in greater detail hereinafter. In one embodiment of the invention, the remote telemetry unit 20X relays the signal output from one or more of the liquid flow monitor 20F, the liquid level monitor 20L or the liquid pressure monitor 20P upon sensing a liquid flow characteristic within the major liquid distribution channels 20. The remote telemetry unit 20X may relay information to the liquid provider 12 by a number of suitable means such as a wire connection, wireless connections, internet connections and the like as will be described in greater detail with reference to FIG. 4. The remote telemetry unit 20X may also receive signals from the liquid provider 12. The signals received by the remote telemetry unit 20X from the liquid provider 12 may include various types of signals such as reset signals, calibration signals and the like.

A manifold 30 directs the liquid 11 from the major distribution channel 20 to minor distribution channels 31 and 32 shown as liquid distribution conduits or pipes. The minor distribution channel 31 includes a liquid monitor 31M connected to a remote telemetry unit 31X. The liquid monitor 31M may comprise one or more of a liquid flow monitor 31F, a liquid level monitor 31L or a liquid pressure monitor 31P. The remote telemetry unit 31X communicates with the liquid provider 12 to relay the signal output from the one or more of the liquid flow monitor 31F, the liquid level monitor 31L or the liquid pressure monitor 31P regarding the liquid flow characteristic within the major liquid distribution channels 31.

Similarly, the minor distribution channel 32 includes a liquid monitor 32M connected to a remote telemetry unit 32X. The liquid monitor 32M may comprise one or more of a liquid flow monitor 32F, a liquid level monitor 32L or a liquid pressure monitor 32P. The remote telemetry unit 32X communicates with the liquid provider 12 to relay the signal output from the one or more of the liquid flow monitor 32F, the liquid level monitor 32L or the liquid pressure monitor 32P regarding the liquid flow, characteristic within the major liquid distribution channels 32.

A manifold 41 directs the liquid 11 from minor distribution channel 31 to local liquid distribution channels 51 and 52. The liquid distribution channels 51 includes a liquid monitor 51M connected to a remote telemetry unit 51X. The liquid monitor 51M may comprise one or more of a liquid flow monitor 51F, a liquid level monitor 51L or a liquid pressure monitor 51P. The remote telemetry unit 51X communicates with the liquid provider 12 to relay the signal output from the one or more of the liquid flow monitor 51F, the liquid level monitor 51L or the liquid pressure monitor 51P regarding the liquid flow characteristic within the major liquid distribution channels 51.

The liquid distribution channel 52 includes a liquid monitor 52M connected to a remote telemetry unit 52X. The liquid monitor 52M may comprise one or more of a liquid flow monitor 52F, a liquid level monitor 52L or a liquid pressure monitor 52P. The remote telemetry unit 52X communicates with the liquid provider 12 to relay the signal output from the one or more of the liquid flow monitor 52F, the liquid level monitor 52L or the liquid pressure monitor 52P regarding the liquid flow characteristic within the major liquid distribution channels 52.

A manifold 42 directs the liquid 11 from minor distribution channel 32 to local liquid distribution channels 53 and 54. The liquid distribution channel 53 includes a liquid monitor 53M connected to a remote telemetry unit 53X. The liquid monitor 53M may comprise one or more of a liquid flow monitor 53F, a liquid level monitor 53L or a liquid pressure monitor 53P. The remote telemetry unit 53X communicates with the liquid provider 12 to relay the signal output from the one or more of the liquid flow monitor 53F, the liquid level monitor 53L or the liquid pressure monitor 53P regarding the liquid flow characteristic within the major liquid distribution channels 53.

The liquid distribution channel 54 includes a liquid monitor 54M connected to a remote telemetry unit 54X. The liquid monitor 54M may comprise one or more of a liquid flow monitor 54F, a liquid level monitor 54L or a liquid pressure monitor 54P. The remote telemetry unit 54X communicates with the liquid provider 12 to relay the signal output from the one or more of the liquid flow monitor 54F, the liquid level monitor 54L or the liquid pressure monitor 54P regarding the liquid flow characteristic within the major liquid distribution channels 54.

The local liquid distribution channels 51-54 provide liquid flow to a multiplicity of users through user channels 60A-60O. In this example, the multiplicity of users are shown as user sites 62A-62O to be representative of tracts of land having commercial, industrial, residential or recreational land uses. In this example, the user sites 62A-62O are shown as residential land uses. Each of the user sites has a user irrigation system 64A-64O controlled by controllable user valve 66A-66O for irrigating the respective tracks of land 62A-62O. The term valve or controllable user valve as contemplated herein is intended to embrace various types of flow control devices including gates, weirs and the like.

FIG. 1A illustrates the continuation of the minor liquid distribution channel 32 for providing the liquid 11 to minor liquid distribution channels 55-58. The minor liquid distribution channel 32 is connected to minor liquid distribution channels 55 and 56 to a liquid storage site 62P. In this example, the liquid storage site 62P is shown as a liquid retention pond 64P but it should be understood that the liquid storage site 62P may take other forms such as liquid retention tanks, liquid retention reservoirs and the like.

The liquid storage site 62P provides a storage area for excess liquid 11 from the liquid distribution system 10. The minor liquid distribution channel 56 is connected through a controllable user valve 66P to the liquid storage site 62P. The minor liquid distribution channel 56 and the controllable user valve 66P provide an input to the liquid storage site 62P from the liquid distribution system 10.

The liquid storage site 62P is connected through a controllable user valve 67P and a pump 68P to the minor liquid distribution channel 55. The pump 68P, the controllable user valve 67P and the minor liquid distribution channel 55 provide an output from the liquid storage site 62P into the liquid distribution system 10. Preferably, a liquid monitor 55M comprising a liquid level monitor 55L is connected to a remote telemetry unit 55X for communicating a signal output from the liquid level monitor 55L to the liquid provider 12 regarding the liquid level of the liquid storage site 62P to the liquid provider 12.

The minor liquid distribution channel 57 provides the liquid 11 to a user irrigation system 64Q through a controllable user valve 66Q to a recreational site 62Q. In this example, the recreational site 62Q is shown as golf course. The operation of the user irrigation system 64Q and the controllable user valve 66Q will be described in greater detail with respect to FIGS. 5-9.

The minor liquid distribution channel 58 provides the liquid 11 to user irrigation systems 64R-64U through controllable user valves 66R-66U to industrial sites 62R-62U. In this example, the industrial sites 62R-62U are shown as a commercial or an industrial park.

Referring back to FIG. 1, the present invention includes a control 70 comprising a liquid provider control 71 and a user control 72. Typically, the liquid provider control 71 is installed at the location at the liquid provider 11. The user control 72 is shown as a plurality of user controls 72A-72U located at selected one or more of the existing user sites 62A-62U shown in FIGS. 1 and 1A.

Each of the plurality of user controls 72A-72U replaces a conventional controller installed in the selected one or more of the existing user sites 62A-62U shown in FIGS. 1 and 1A.

In this example, user controls 72A-72U have been shown installed on all user irrigation systems 64A-64U of the user sites 62A-62U but it should be understood that the user controls 72A-72U may be installed on only some of the user sites 62A-62U.

The liquid provider control 71 and the plurality of user controls 72A-72U are interconnected by a communication connection 80 comprising a provider communication connection 81 communicating with a user communication connection 82. The user communication connection 82 is shown as a plurality of user communication connection 82A-82U located at selected one or more of the existing user sites 62A-62U shown in FIGS. 1 and 1A.

The communication connection 80 may be a wireless connection, a wire connection or an optical connection. The provider communication connection 81 may comprise a provider transmitter or transceiver. The provider communication connection 81 may incorporate a satellite connection, mesh network, a repeater provider communication connections 81. Each of plurality of user. communication connections 82A-82U comprises a plurality of user receivers or transceiver. The plurality of user communication connection 82A-82U may incorporate a satellite connection, mesh network, a repeater user communication connections 82.

As will be described in greater detail hereinafter, the liquid provider control 71 communicates with the plurality of user controls 72A-72U to override the operation of selected controllable user valves 66A-64U located at the user sites 62A-62U. The override of the selected controllable user valves 66A-64U enables the liquid provider control 71 to maintain the liquid flow, the liquid level and/or liquid pressure in the channels 20, 31-32 and 51-54.

Figure 2:
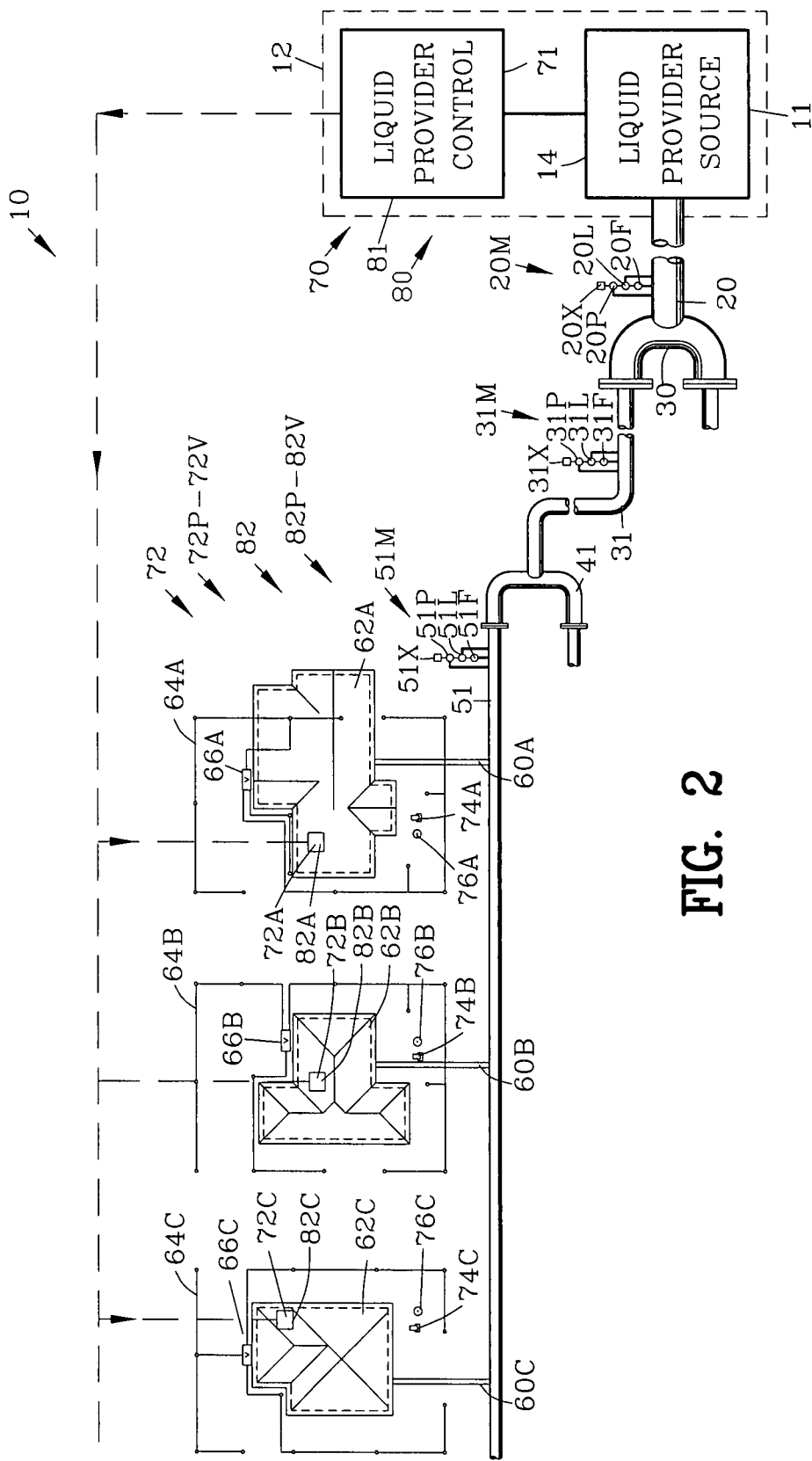
FIG. 2 is an enlarged view of a portion of FIG. 1.

FIG. 2 is an enlarged view of a portion of FIG. 1 illustrating user controls 72A-72C for receiving signals transmitted by the liquid provider control 71. The user controls 72A-72C operate the controllable user valves 66A-64C to discontinue or interrupt the user irrigation systems 64A-64C upon an appropriate signal from the liquid provider control 71. The liquid provider control 71 provides an appropriate signal to selected plurality of user controls 72A-72C to discontinue or interrupt the user irrigation systems 64A-64C upon the detection of a low liquid flow, a low liquid level and/or a low liquid pressure in the channels 20, 31-32 and 51-58. In the alternative, the liquid provider control 71 provides an appropriate signal to selected plurality of user controls 72A-72C to actuate the user irrigation systems 64A-64C upon the detection of a high liquid flow, a high liquid level and/or a high liquid pressure in the channels 20, 31-32 and 51-58. In a further alternative, the liquid provider control 71 provides an appropriate signal to selected plurality of user controls 72A-72C to lock out operation of the user irrigation systems 64A-64C in accordance with an environmental or governmental scheduled or managed irrigation program. It should be appreciated that the liquid provider control 71 only operates to control selective ones of the plurality of user controls 72A-72U to discontinue or actuate the user irrigation systems 64A-64U that incorporate a user control 72 of the present invention.

Figure 3:
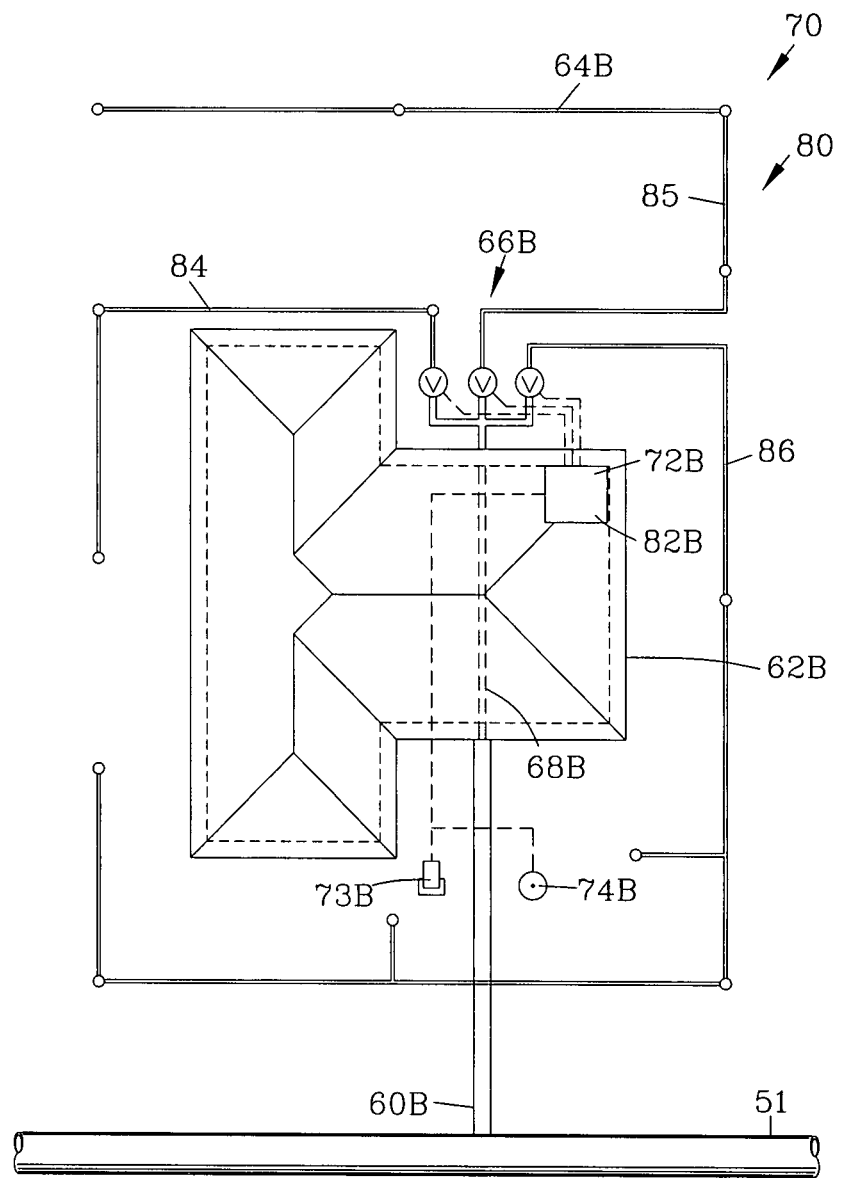
FIG. 3 is a magnified view of one user sites of FIG. 2.

FIG. 3 is a magnified view of one of the user site 62B of FIG. 2. The local liquid distribution channel 51 provides liquid flow through the user channel 60B to the user site 62B. The reduction in size of the irrigation channel 68B relative to the user channel 60B permits only a portion of the liquid 11 from the user channel 60B to feed into the irrigation channel 68B to provide liquid 11 to the controllable user valves 66B. The controllable user valves 66B provide liquid 11 to three zones 84-86 of the user irrigation systems 64B. The controllable user valves 66B are operated by the user control 72B of the present invention. The user control 72B of the present invention has been installed in place of a conventional controller. Preferably, the user control 72B of the present invention includes all of the programmable features of a conventional controller with the addition of the user connections 82B for communication with the provider connection 81. An optional rain gauge 73B and a moisture sensor 74B have been connected to provide inputs to the user control 72B.

Figure 4:
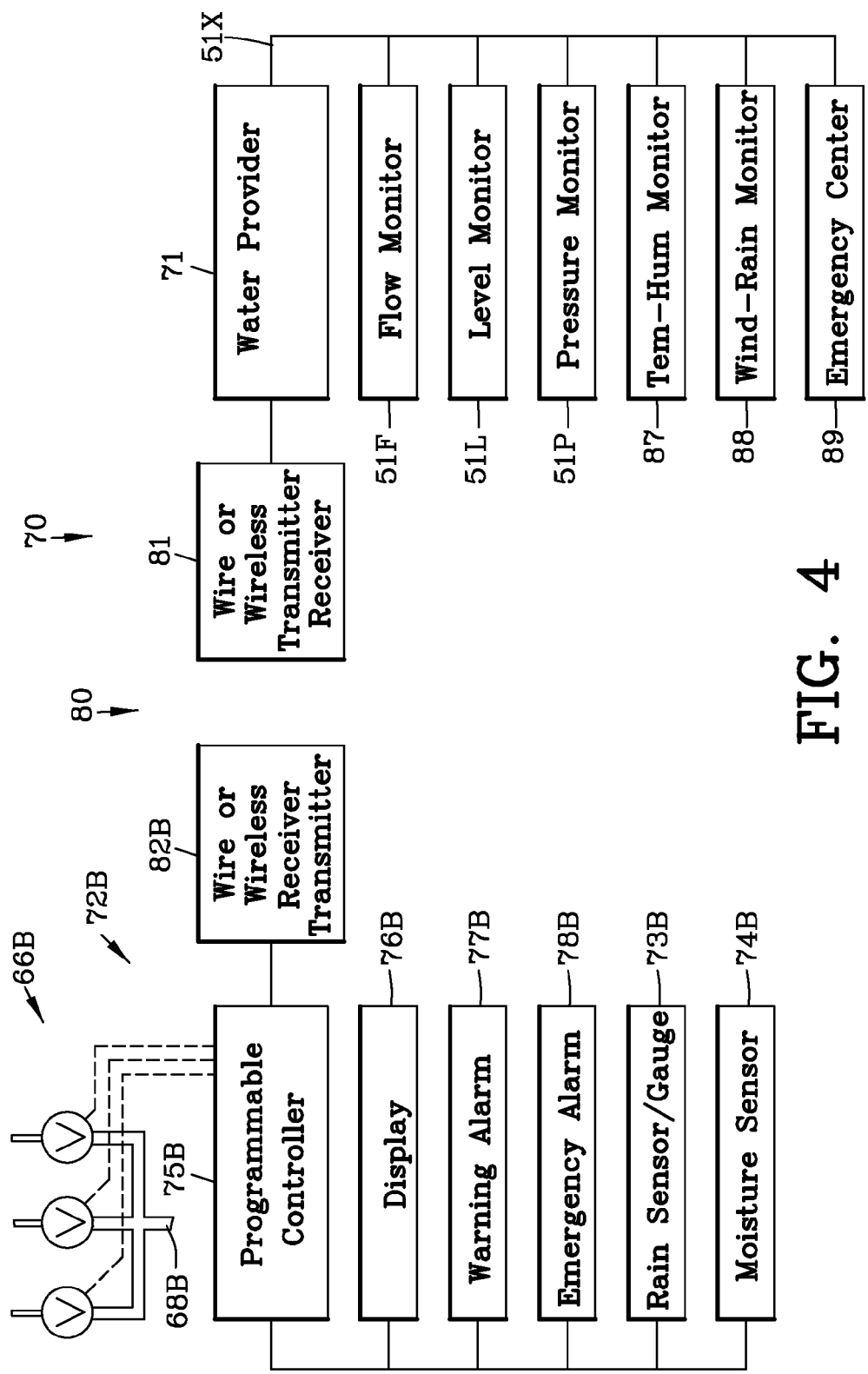
FIG. 4 is a block diagram of a control of the present invention located in the user site of FIG. 3.

FIG. 4 is a block diagram of the control 70 of the present invention illustrating the liquid provider control 71 and the user control 72B shown in FIG. 3. The liquid provider control 71 is connected to the provider communication connection 81 whereas the user control 72B is connected to user communication connection 82B for enabling communication therebetween. Preferably, the provider communication connection 81 includes a transmitter and a receiver whereas the user communication connection 82B includes a receiver and a transmitter.

The liquid provider control 71 is connected to the liquid flow monitor 51F, the liquid level monitor 51L and the liquid pressure monitor 51P through either a wire connection or a wireless connection 70C. The liquid provider control 71 may be connected to a temperature and humidity monitor 87 and a wind and rain monitor 88. Optionally, the liquid provider control 71 may be connected to an emergency center 89 such as an emergency center, a homeland security center, a weather center and the like.

The user control 72B comprises a programmable controller 75B and a display 76B. The display 76B may be a touch screen for programming the programmable controller 75B. In the alternative, the programmable controller 75B may be programmed through conventional keys or through a communication with an external computer. In addition, the programmable controller 75B may be programmed remotely by the liquid provider control 71.

The programmable controller 75B may be programmed in a conventional manner to control the operation of the controllable user valves 66B. The programmable controller 75B may be programmed for date and time of irrigation, sequential and/or multiple zone irrigation, compensation for past and present rain fall, compensation for soil moisture content and compensation for atmospheric temperature and humidity.

The user control 72 may be connected to the optional rain sensor 73B and/or the optional moisture sensor 74B as shown in FIG. 3. The programmable controller 75B alters a pre-established program irrigation schedule based on rain fall as measured by the rain sensor 73B and/or the soil moisture content as measured by the moisture sensor 74B. An optional warning alarm 77B may be provided to alert persons at the user site of various malfunctions relating to the user irrigation system MB. In a further option, the user controls 72B is shown connected to an emergency alarm 78B. The receiver transmitter 82B transmits to the transmitter receiver 81 of the liquid provider 71 for communicating information from the user control 72 to the liquid provider 71 including information regarding the optional rain sensor 73B and/or the optional moisture sensor 74B.

The user communication connection 82B receives signals from the provider communication connection 81 of the liquid provider control 71 to override the operation of the programmable controller 75B. The signals from the provider communication connection 81 provide additional inputs to the programmable controller 75B to alter, modify or override the operation of the programmable controller 75B. The signals from the provider communication connection 81 may actuate and/or deactuate the controllable user valves 66B. In addition, the signals from the provider communication connection 81 actuate an optional emergency alarm 78B to alert persons at the user site of emergencies from an emergency center such as a homeland security center, a weather center and the like. The user liquid provider control 72B may provide information to the liquid provider control 71 regarding the operation and the data collected by the user provider control 72B. Data collected from the user provider control 72B may include any of the information present at the programmable controller 75B including evapotranspiration (ET) data, precipitation data, meteorological data, ground moisture data, watering data, alarm data and the like.

A control system 70 shown in FIGS. 1-4 operates in the following manner. Under normal operating conditions, the liquid 11 flows from the liquid provider 12 through the major liquid distribution channel 20 and manifolds 41 and 42 into the local liquid distribution channels 51-54 shown in FIG. 1. In addition, the liquid 11 flows from the liquid provider 12 into the local liquid distribution channels 55-58 shown in FIG. 1A. The liquid provider control 71 monitors the liquid monitors 20M, 31M, 32M, 51M-55M for insuring a proper operating liquid flow condition exits in the local liquid distribution channels 51-58.

In the event a proper operating liquid flow condition exits in the local liquid distribution channels 51-58, then liquid provider control 71 will permit the plurality of user controls 72A-72U to operate in an uninhibited manner. Each of the plurality of user controls 72A-72U operates controllable user valve 66A-66U for irrigating the respective tracks of land 62A-62U in accordance with the programs of the respective one of the plurality of user controls 72A-72U.

In the event an operating liquid flow condition exits in one of the local liquid distribution channels 51-58, then liquid provider control 71 will generate a signal to override selected ones of the plurality of user controls 72A-72U. For example, in the event the liquid monitor 51M detects a low liquid flow or a low liquid level and/or a low liquid pressure in the local liquid distribution channel 51, then the liquid provider control 71 generates signals to override selected ones of the plurality of user controls 72A-72D for closing the respective controllable user valve 66A-66D irrigating the respective tracks of land 62A-62D. The closing of selected ones of the controllable user valve 66A-66D reduces the liquid use flowing from local liquid distribution channel 51 thus restoring the low liquid flow or the low liquid level or the low liquid pressure in the local liquid distribution channel 51.

After the liquid flow or liquid level and/or liquid pressure in the local liquid distribution channel 51, returns to the desired level, the liquid provider control 71 will open the interrupted plurality of controllable user valves 66A-66D to continue normal operation of the user irrigation systems 64A-64D. The programmable controller 75B will continue the remainder of the operation cycle after being interrupted by the liquid provider control 71 to provide the proper time for irrigation after the delay caused by the closing of the controllable user valves 66A-66D by the liquid provider control 71.

In the event the liquid monitor 54M detects a low liquid flow or a low liquid level and/or a low liquid pressure in the local liquid distribution channel 54, then the liquid provider control 71 generates signals to override selected ones of the plurality of user controls 72M-72O for closing the respective controllable user valve 66M-66O irrigating the respective user sites 62M-62O. The closing of selected ones of the controllable user valve 66M-66O reduces the liquid use emanating from local liquid distribution channel 54 thus restoring the low liquid flow or the low liquid level or the low liquid pressure in the local liquid distribution channel 54.

In the event the closing of the selected controllable user valve 66M-66O does not restore the low liquid flow or the low liquid level or the low liquid pressure in the local liquid distribution channel 54, then the liquid provider control 71 generates signals to actuate pump 68P and open valve 67P to pump liquid from the liquid storage site 62P to restore the low liquid flow or the low liquid level or the low liquid pressure in the liquid distribution channel system 10.

In the event any of the liquid monitors 20M, 31M, 32M, 51M-55M detects a high liquid flow or a high liquid level and/or a high liquid pressure in the liquid distribution channel system 10, then the liquid provider control 71 generates signals to open valve 66P to direct excess liquid from the liquid distribution channel system 10 into the liquid storage site 62P. The flow of excess liquid from the liquid distribution channel system 10 into the liquid storage site 62P reduces the high liquid flow or the high liquid level and/or the high liquid pressure in the liquid distribution channel system 10. The liquid level of the liquid storage site 62P is relayed to the liquid provider control 71 by the liquid monitor 55M to terminate the filling of the liquid storage site 62P upon obtaining a desired liquid level. In the alternative, the liquid provider control 71 may generate signals to open selected ones of valves 66A-66O and/or 66Q-66U to direct excess liquid from the liquid distribution channel system 10 into the user sites 66A-66O and/or 66Q-66U.

Figure 5:
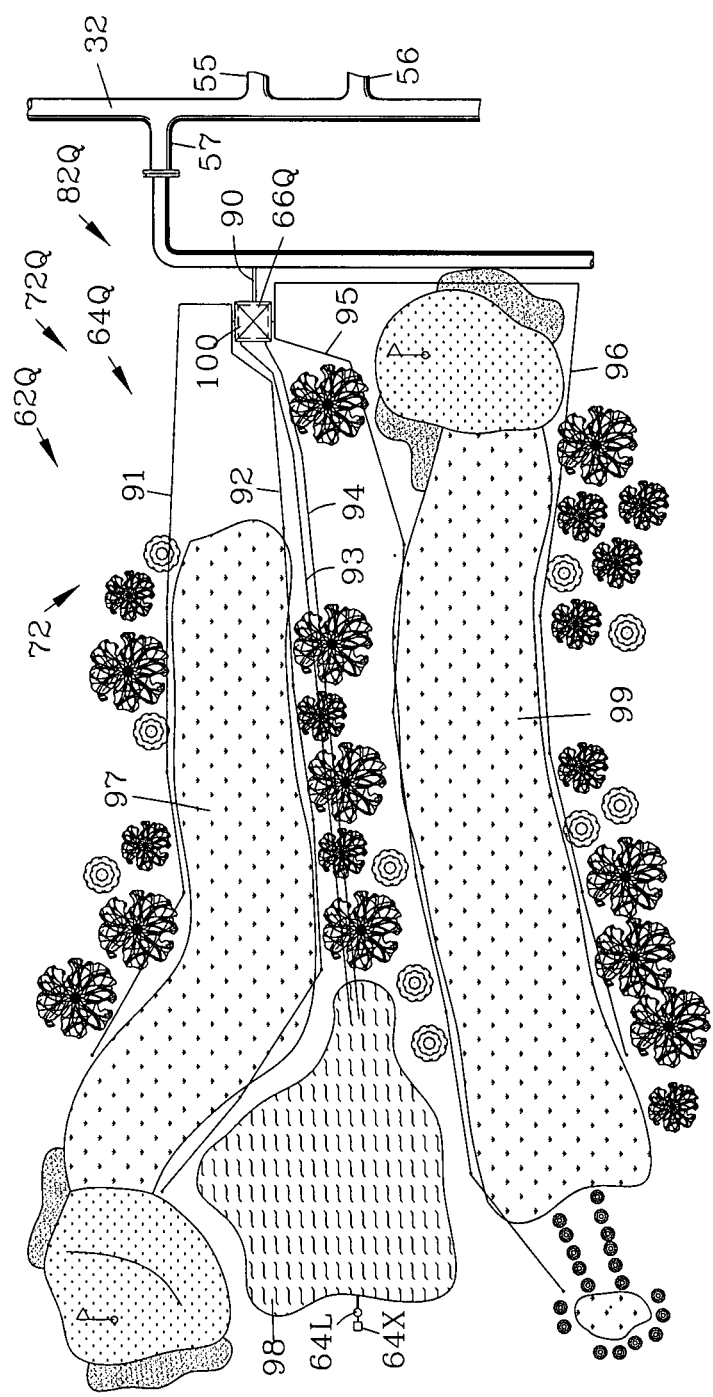
FIG. 5 is an enlarged view of a portion of FIG. 1A
Figure 6:
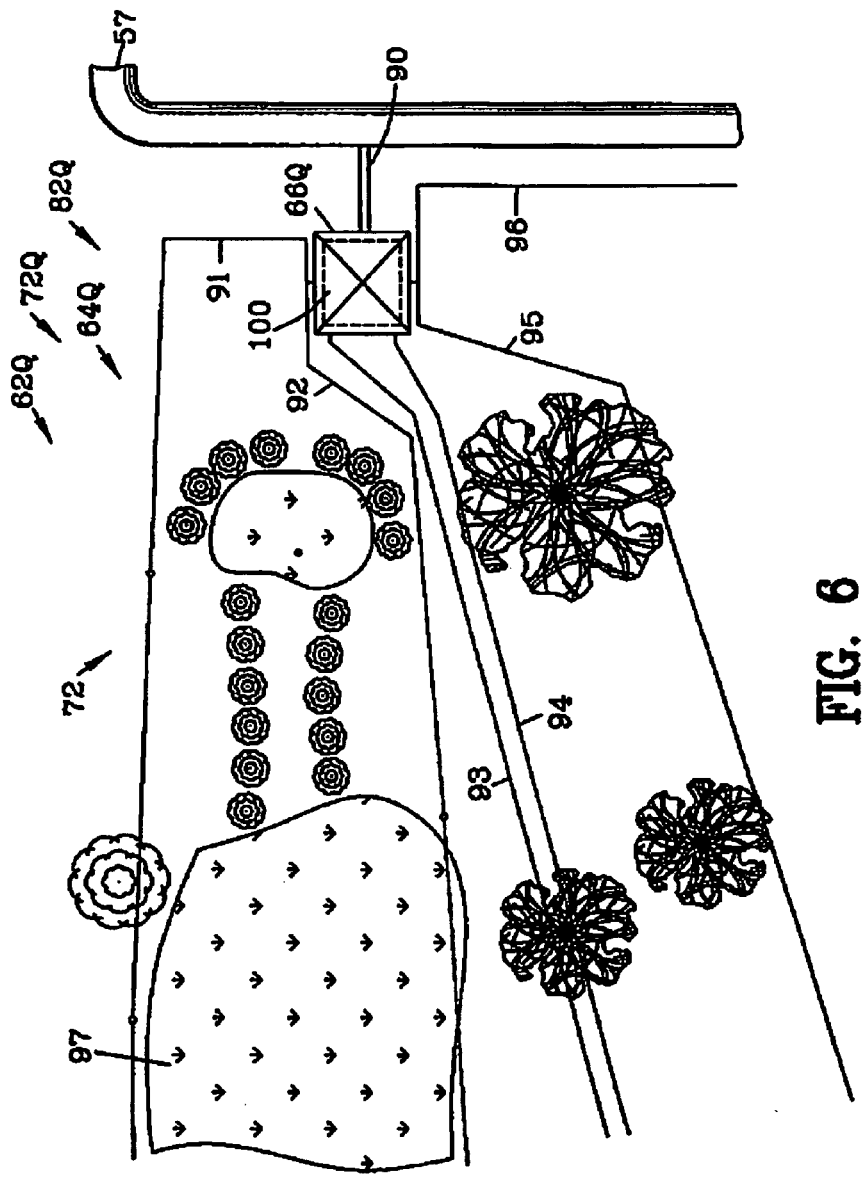
FIG. 6 is a magnified view of a portion of FIG. 5.

FIG. 5 is an enlarged view of a portion of FIG. 1A with FIG. 6 being a magnified view of a portion of FIG. 5. The controllable user valve 66Q directs the liquid 11 from the minor liquid distribution channel 57 through conduit 90 to the user irrigation system 64Q of the golf course recreational site 62Q. The user irrigation system 64Q includes irrigation zones 91 and 92 adjacent fairway 97 and irrigation zones 95 and 96 adjacent fairway 99. Conduits 93 and 94 interconnect the controllable user valve 66Q to a private liquid retention pond 98. The private liquid retention pond 98 includes a liquid level sensor 64L and a remote telemetry unit 64X. Optionally, the liquid retention pond 98 may include liquid pressure monitor and/or a liquid flow monitor (not shown).

FIG. 7 is a diagram of a valve system of FIG. 6 interconnecting the minor liquid distribution channel 57 through conduit 90 to the irrigation zones 91, 92, 95 and 96 and to the conduits 93 and 94. The controllable user valve 66Q receives the liquid 11 from the minor liquid distribution channel 57 through the conduit 90. A valve matrix 100 comprises valves 101-104 directing the liquid 11 from the controllable user valve 66Q to conduits 91-96. A pump 105 is interposed between the conduit 94 and valve 104.

During normal operation of the control system 70, the liquid 11 from the minor liquid distribution channel 57 flows through conduit 90 and the controllable user valve 66Q and valves 101 and 103 to irrigate irrigation zones 91 and 92 adjacent fairway 97 and irrigation zones 95 and 96 adjacent fairway 99.

FIG. 8 illustrates the valves 101-104 positioned to direct the liquid 11 from the minor liquid distribution channel 57 to fill the private liquid retention pond 98. During normal operation of the control system 70 or during an excess of liquid in the liquid distribution channel system 10, the liquid 11 from the minor liquid distribution channel 57 may be directed to fill the private liquid retention pond 98.

FIG. 9 illustrates the valves 101-104 positioned to pump the liquid 11 from the private liquid retention pond 98 into the irrigation zones 91 and 92 adjacent fairway 97 and irrigation zones 95 and 96 adjacent fairway 99. In the event the liquid provider control 71 generates signals to close the user controls 66Q, the recreational site 62Q may be irrigated from the private liquid retention pond 98. In contrast to the liquid storage site 62P, the liquid retention pond 98 is a private reservoir and is controlled and operated by the owners of the recreational site 62Q.

Figure 10:
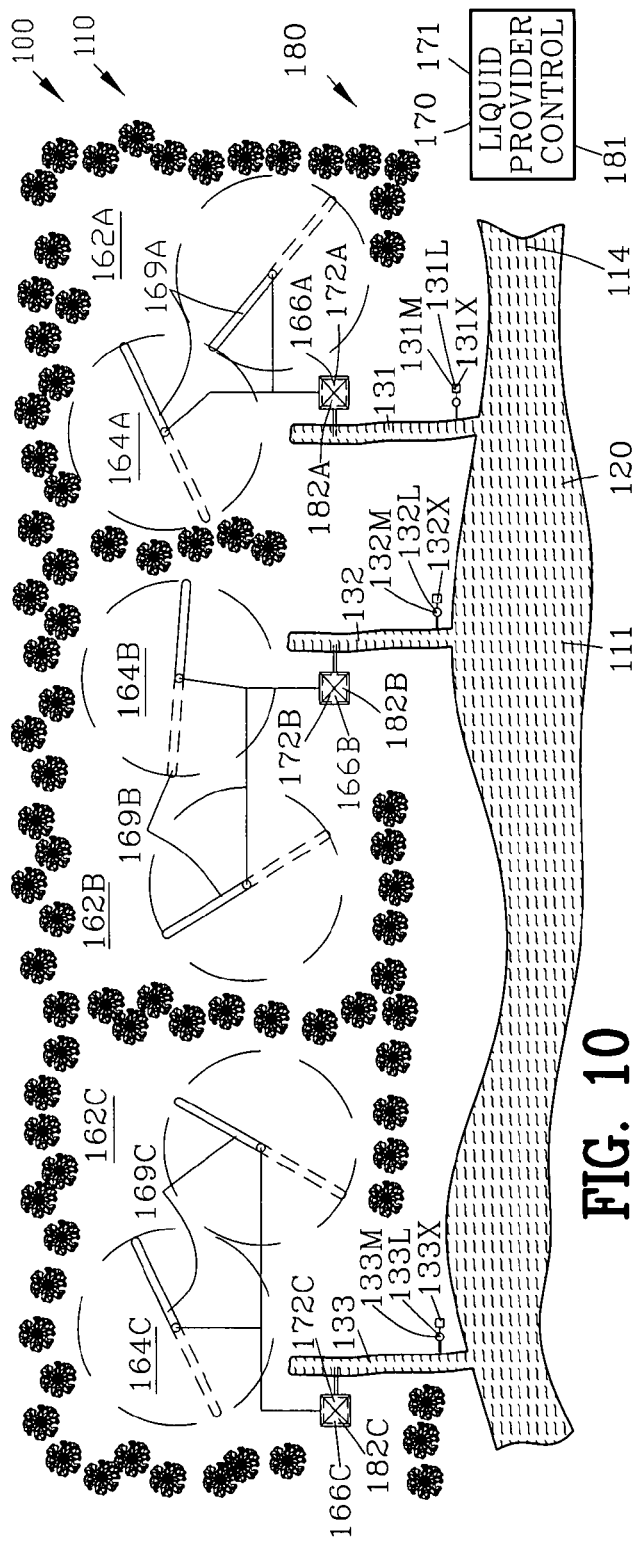
FIG. 10 is a top view of a second example of a liquid distribution system.
Figure 11:
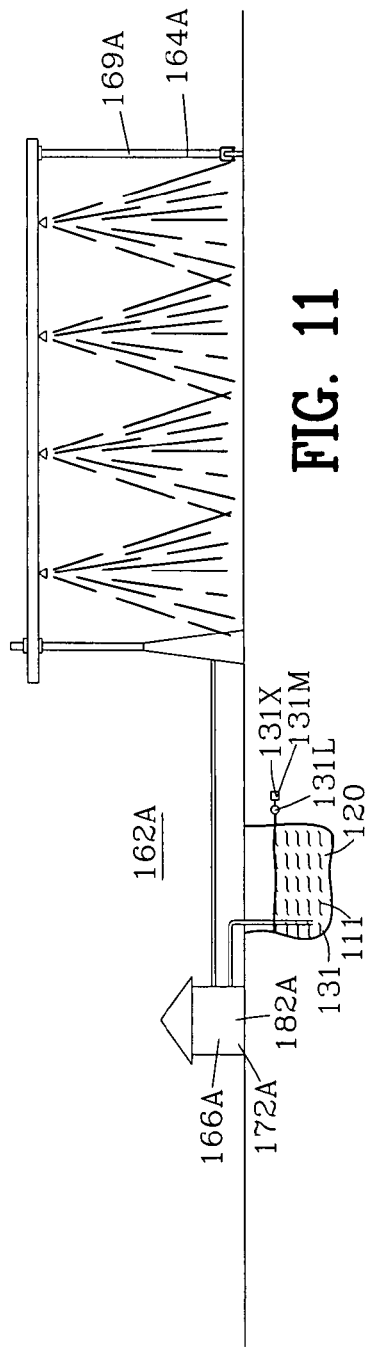
FIG. 11 is a side view of the liquid distribution system of FIG. 10.
Figure 14:
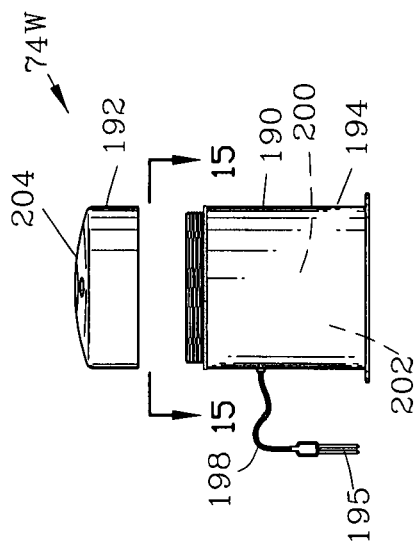
FIG. 14 is an exploded view of the moisture sensor of FIG. 12 removed from the ground surface.
Figure 15:
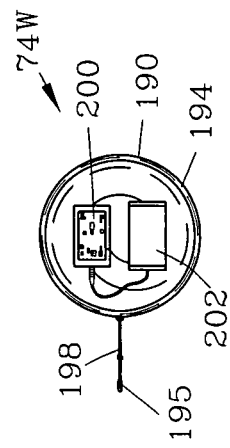
FIG. 15 is a view along line 15-15 in FIG. 14.
Figure 13:
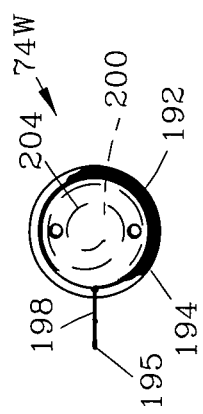
FIG. 13 is a top view of FIG. 12.
Figure 12:
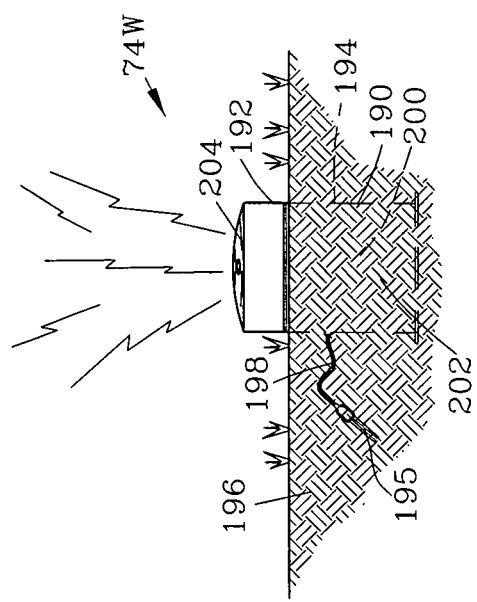
FIG. 12 is an enlarged side view of an example of a moisture sensor suitable for use with the present invention located in a ground surface.

FIGS. 10 and 11 are top and side views of a second example of a liquid distribution system 110A for regulating the flow of a liquid 111 by a water management provider 112 controlling a natural water source 114. In this example, the liquid distribution system 110 controls a major liquid distribution channel 120 shown as a creek, a stream, a river or an irrigation channel.

The liquid 111 is directed from the major distribution channel 120 to minor distribution channels 131-133 show as irrigation channels or irrigation conduits. Each of the minor distribution channels 131-133 includes a liquid monitor 131M-133M connected to a remote telemetry unit 130X-133X. Each of the liquid monitors 131M-133M comprises a liquid level monitor 131L-133L.

The minor distribution channels 131-133 provide liquid flow to a multiplicity of users sites 162A-162C that are representative of tracts of land having an agricultural land uses. Each of the user sites has a user irrigation system 164A-164C controlled by controllable user valve 166A-166C for irrigating the respective tracks of land 162A-162C. The controllable user valves 166A-166C provide liquid 11 to rotary irrigators 169A-169C for irrigating crops in the respective tracks of land 162A-162C.

A control 170 comprises a liquid provider control 171 and a plurality of user controls 172A-172C. The plurality of user controls 172A-172C are located at the existing user sites 162A-162C. Each of the plurality of user controls 172A-172C is similar to the user control 72B show in FIG. 4. The user controls 172A-172C have been shown installed on all user irrigation systems 164A-164C of the user sites 162A-162C but it should be understood that the user controls 172A-172C maybe installed on only some of the user sites 162A-162C.

The liquid provider control 171 and the plurality of user controls 172A-172C are interconnected by a communication connection 180 comprising a provider communication connection 181 communicating with a plurality of user communication connections 182A-182C.

The remote telemetry units 131X-133X communicates with the water management provider 112 through the communication connection 180 to relay the signal output from the liquid level monitors 131L-133L regarding the liquid level within the minor liquid distribution channels 131-133.

The liquid provider control 171 communicates with the plurality of user controls 172A-172C to override the operation of selected controllable user valves 166A-164C located at the user sites 162A-162C. The override of the selected controllable user valves 166A-164C enables the liquid provider control 171 to maintain the liquid level in the major distribution channel 120 to minor distribution channels 131-133.

FIGS. 12-15 are various views of an example of a moisture sensor 74W suitable for use with the present invention. In this example, the moisture sensor 74W comprises a container 190 sealing with a closure 192 to form a water-tight enclosure 194. A moisture sensor probe 195 is inserted within a ground surface 196 of the user sites 62. The moisture sensor probe 195 is connected by a conductor 198 to a wireless transmitter 200 located within the water-tight enclosure 194. Preferably, a battery power supply 202 is located within the water-tight enclosure 194 for operating the wireless transmitter 200.

An antenna 204 is connected to the wireless transmitter 200 to transmit a wireless signal representative of the moisture content of the ground surface 196 of the user sites 62. Preferably, a conventional compatible wireless receiver (not shown) is located proximate to the respective user sites 62. A series of moisture sensors 74W may be arranged in a pattern to enable the series of moisture sensors 74W to act as repeaters, a mesh array or the like for eliminated the need for a wire system. For, example, series of moisture sensors 74W may be arranged along the fairways 97 and 99 for eliminated the need for an underground wire system.

The present disclosure includes that contained in the appended claims as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. A control system for regulating the flow of a liquid from a liquid provider through a liquid distribution system, the liquid distribution system having liquid monitors for sensing a liquid flow characteristic within a major and a plurality of minor distribution channels, the plurality of minor distribution channels connected to a multiplicity of user channels for providing a flow of liquid to each of a multiplicity of users, the liquid provider having a transmitter and receiver connected to the liquid monitors sensing the liquid flow characteristic within the major and the plurality of mirror distribution channels, comprising:

an irrigation channel connected to each of said multiplicity of user channels for receiving a flow of a liquid downstream from the user channel;

an irrigation system having an irrigation zone connected to each of said irrigation channels;

a controllable user valve located in each of said irrigation channels upstream from said irrigation system for controlling the liquid flow from said irrigation channel to said irrigation system;

a user transmitter and receiver connected to said controllable valve located in each of said irrigation channels;

the liquid provider transmitter and receiver transmitting a first signal to said user transmitter and receiver upon sensing an undesired liquid flow characteristic within one of the major and plurality of minor distribution channels to close said controllable user valves to terminate the flow of liquid to said irrigation system of said multiplicity of users to restore a desired liquid flow characteristic within the major and the plurality of minor distribution channels and the multiplicity of user channels; and said liquid provider transmitter and receiver transmitting a second signal to said user transmitter and receiver upon sensing a desired liquid flow characteristic within the major and plurality of minor distribution channels to cause said controllable user valves to open to cause flow of liquid to said irrigation system of said multiplicity of users to irrigate the landscape of said multiplicity of users by causing a programmable user control connected to the user transmitter and receiver to continue a remainder of a pre-established program irrigation schedule which was cancelled due to the first signal.

2. The control system for regulating the flow of a liquid as set forth in claim 1, wherein the liquid provider is a municipal water plant 3. The control system for regulating the flow of a liquid as set forth in claim 1, wherein the liquid flow characteristic is selected from the group consisting of a liquid pressure characteristic, a liquid level characteristic and a liquid flow rate characteristic.

4. The control system for regulating the flow of a liquid as set forth in claim 1, wherein said liquid monitor is connected to said liquid provider control by one of a wireless connection and a wire connection.

5. The control system for regulating the flow of a liquid as set forth in claim 1, wherein each of said plurality of controllable user valves is connected to said programmable user control by one of a wireless connection and a wire connection.

6. The control system for regulating the flow of a liquid as set forth in claim 1, wherein said liquid provider transmitter and receiver communicating with said user transmitter and receiver for transmitting information unrelated to liquid flow including information from an emergency center.

7. The control system for regulating the flow of a liquid as set forth in claim 1, wherein said liquid provider transmitter and receiver communicating with said user transmitter and receiver for transmitting information including information from an emergency center and weather center; and said user transmitter and receivers transmitting to said transmitter and receiver of said liquid provider for communicating information from said programmable user control to the liquid provider including information regarding fall or moisture.

8. A control system for regulating the flow of a liquid from a liquid provider through a liquid distribution system, the liquid distribution system having liquid monitors for sensing a liquid flow characteristic within a major and a plurality of minor distribution channels, the plurality of minor distribution channels connected to a multiplicity of user channels for providing a flow of liquid to each of a multiplicity of users, the liquid provider having a liquid provider transmitter and receiver connected to the liquid monitors sensing the liquid flow characteristic within the major and the plurality of minor distribution channels; comprising:

an irrigation channel connected to each of said multiplicity of user channels for receiving a flow of a liquid downstream from the user channel;

an irrigation system having an irrigation zone connected to each of said irrigation channels;

a controllable user valve located in each of said irrigation channels upstream from said irrigation system having an irrigation zone;

a programmable user control connected to each of said plurality of controllable user valves for controlling said plurality of controllable user valves to irrigate said user site in accordance with a pre-established program irrigation schedule;

a user transmitter and receiver connected to said programmable user control located in each of said irrigation channels;

said liquid provider transmitter and receiver generating an interruption signal to selected user transmitter and receivers upon said liquid monitors sensing an undesired liquid flow characteristic within the major and minor liquid distribution channels;

said interruption signal received by said selected user transmitter and receivers overriding said programmable user control and discontinuing said pre-established program irrigation schedule said programmable user control by closing at least one of said plurality of controllable user valves to restore a desired liquid flow characteristic within said major and minor liquid distribution channels; and said liquid provider transmitter and receiver communicating with said selected user transmitter and receivers upon the liquid monitors sensing a desired liquid flow characteristic within the major and minor liquid distribution channels by causing said programmable user control to continue a remainder of said pre-established program irrigation schedule by opening at least one of said plurality of controllable user valves.

9. A control system for regulating the flow of a liquid from a liquid provider through a liquid distribution system, the liquid distribution system having liquid monitors for sensing a liquid flow characteristic within a major and a plurality of minor distribution channels, the plurality of minor distribution channels connected to a multiplicity of user channels for providing a flow of liquid to each of a multiplicity of users, the liquid provider having a liquid provider transmitter and receiver connected to the liquid monitors sensing the liquid flow characteristic within the major and the plurality of minor distribution channels; comprising:

an irrigation channel connected to each of said multiplicity of user channels for receiving a flow of a liquid downstream from the user channel;

an irrigation system having an irrigation zone connected to each of said irrigation channels;

a controllable user valve located in each of said irrigation upstream from said irrigation system having an irrigation zone;

a programmable user control connected to each of said plurality of controllable user valves for controlling said plurality of controllable user valves to irrigate said user site in accordance with a pre-established program irrigation schedule;

a user transmitter and receiver connected to said programmable user control located in each of said irrigation channels;

said liquid provider transmitter and receiver generating a first signal to selected user transmitter and receivers upon said liquid monitors sensing an undesired low liquid flow characteristic within the major and minor liquid distribution channels;

said first signal received by said selected user transmitter and receivers overriding said programmable user control and discontinuing said pre-established program irrigation schedule of said programmable user control by closing any opened one of said plurality of controllable user valves for restoring a desired liquid flow characteristic within said major and minor liquid distribution channels;

said liquid provider transmitter and receiver communicating with said selected user transmitter and receivers upon the liquid monitors sensing a desired liquid flow characteristic within the major and minor liquid distribution channels by causing said programmable user control to continue a remainder of said pre-established program irrigation schedule, said liquid provider transmitter and receiver generating a second signal to selected user transmitter and receivers upon said liquid monitors sensing an undesired high liquid flow characteristic within the major and minor liquid distribution channels;

said second signal received by said selected user transmitter and receivers overriding, said pre-established program irrigation schedule of said programmable user control by opening at least one of said plurality of controllable user valves to restore a desired liquid flow characteristic within said major and minor liquid distribution channels; and said liquid provider transmitter and receiver communicating with said selected user transmitter and receivers upon the liquid monitors sensing a desired liquid flow characteristic within the major and minor liquid distribution channels by causing said programmable user control to continue a remainder of said pre-established program irrigation schedule.

10. A process for regulating the flow of a liquid from a liquid provider through a liquid distribution system, the distribution system having a major liquid distribution channel connected to a plurality of minor liquid distribution channels and coupled to a multiplicity of user channels for providing the flow of the liquid to a multiplicity of users, comprising the steps of;
monitoring a liquid flow characteristic of the liquid in the major and the plurality of minor liquid distribution channels;
sending the liquid flow characteristic from the major and the plurality of minor liquid distribution channels to the liquid provider;
connecting an irrigation channel downstream from each of the multiplicity of user channels for directing a flow of a liquid from the user channel to an irrigation zone of an irrigation system.;
interposing a controllable user valve into the irrigation channel upstream from the irrigation zone;
transmitting a first signal from the liquid provider upon sensing an undesired liquid flow characteristic within the major or the plurality of minor liquid distribution channels to close the controllable user valve to terminate or delay the flow of the liquid from the user channel to the irrigation zone of the irrigation system to restore a desired liquid flow characteristic within the major or the plurality of minor liquid distribution channels of the liquid distribution channels and the multiplicity of user channels; and
transmitting a second signal from the liquid provider upon sensing a desired liquid flow characteristic within the major or the plurality of minor liquid distribution channels to open the controllable user valve to cause the flow of liquid from said irrigation channel to said irrigation system to irrigate the landscape of said multiplicity of users a user transmitter and receiver connected to said controllable valve located in each of said irrigation channels;
the liquid provider transmitter and receiver transmitting a first signal to said user transmitter and receiver upon sensing an undesired liquid flow characteristic within one of the major and plurality of minor distribution channels to close said controllable user valves to terminate the flow of liquid to said irrigation system of said multiplicity of users to restore a desired liquid flow characteristic within the major and the plurality of minor distribution channels and the multiplicity of user channels; and
said liquid provider transmitter and receiver transmitting a second signal to said user transmitter and receiver upon sensing a desired liquid flow characteristic within the major and plurality of minor distribution channels to cause said controllable user valves to open to cause flow of liquid to said irrigation system of said multiplicity of users to irrigate the landscape of said multiplicity of users by causing a programmable user control connected to the user transmitter and receiver to continue a remainder of a pre-established program irrigation schedule which was cancelled due to the first signal.

11. The process for regulating the flow of a liquid from a liquid provider as set forth in claim 10, wherein the step of monitoring a liquid flow characteristic of the liquid in one of the major and minor liquid distribution channels includes monitoring the pressure of the liquid in one of the major and minor liquid distribution channels.

12. The for regulating the flow of a liquid from a liquid provider as set forth in claim 10, wherein the step of monitoring a liquid flow characteristic of the liquid in one of the major and minor liquid distribution channels includes monitoring the level of the liquid in one of the major and minor liquid distribution channels.

13. The process for regulating the flow of a liquid from a liquid provider as set forth in claim 10, wherein the step of monitoring a liquid flow characteristic of the liquid in one of the major and minor liquid distribution channels includes monitoring the flow of the liquid in one of the major and minor liquid distribution channels.

14. The process for regulating the flow of a liquid form a liquid provider as set forth in claim 10, including the step of transmitting a signal from a user transmitter and receiver to the liquid provider regarding rain fall and moisture at the user site.

15. The process for regulating the flow of a liquid from a liquid provider as set forth in claim 10, including the step of exchanging information between a user transmitter and receiver and the liquid provider unrelated to liquid flow characteristic including information from one of an emergency center, homeland security center and weather center.

16. A process a control system for regulating the flow of a liquid from a liquid provider through a liquid distribution system, the liquid distribution system having liquid monitors for sensing a liquid flow characteristic within a major liquid distribution channel connected to a plurality of minor liquid distribution channels and coupled to a multiplicity of user channels for providing the flow of the liquid to a multiplicity of users, comprising the steps of:
monitoring a liquid flow characteristic signal of the liquid in the major and the plurality of minor liquid distribution channels;
sending the liquid flow characteristic signal from the major and the plurality of minor liquid distribution channels to the liquid provider;
connecting an irrigation channel downstream, from each of the multiplicity of user channels for directing a flow of a liquid from the user channel to an irrigation zone of an irrigation system;
interposing a controllable user valve into the irrigation channel upstream from the irrigation zone;
connecting a programmable user control to each of said plurality of controllable user valves for controlling said plurality of controllable user valves in accordance with a pre-established program irrigation schedule;
transmitting a first signal from the liquid provider upon sensing an undesired low liquid flow characteristic within the major or the plurality of minor liquid distribution channels to override the programmable user control and discontinuing said pre-established program irrigation schedule of the programmable user control to close any opened controllable user valves to restore a desired liquid flow characteristic within said major and minor liquid distribution channels;
transmitting a second signal from the liquid provider upon sensing an undesired high liquid flow characteristic within the major or the plurality of minor liquid distribution channels to override the programmable user control and discontinuing said pre-established program irrigation schedule of the programmable user control to close any opened controllable user valves to restore a desired liquid flow characteristic within said major and minor liquid distribution channels;

transmitting a restore signal from the liquid provider upon sensing a desired liquid flow characteristic within the major or the plurality of minor liquid distribution channels causing said programmable user control to continue a remainder of said pre-established program irrigation schedule.

* * * * *